2,893,936

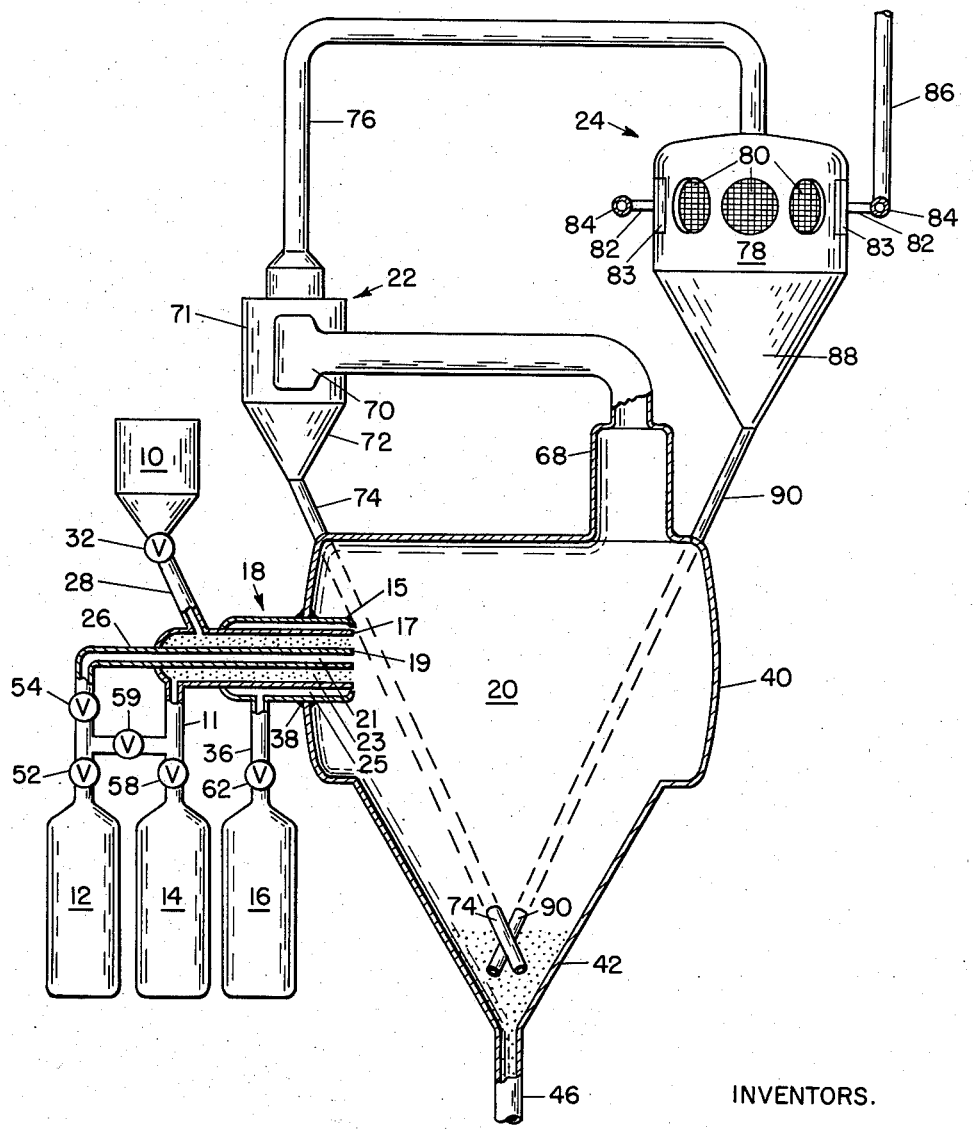
July 7, 1959
L. P. HATCH ET AL
2,893,936
PROCESS FOR CONTINUOUSLY SEPARATING
IRRADIATION PRODUCTS OF THORIUM
Filed May 27, 1955
INVENTORS.
LORANUS P. HATCH
FRANCIS T. MILES
THOMAS V. SHEEHAN
RICHARD H. WISWALL
RAYMOND J. HEUS
BY

United States Patent Office 2,893,936
Patented July 7, 1959

PROCESS FOR CONTINUOUSLY SEPARATING IRRADIATION PRODUCTS OF THORIUM

Loranus P. Hatch, Francis T. Miles, Thomas V. Sheehan, Richard W. Wiswall, and Raymond J. Heus, Suffolk County, N.Y., assignors to the United States of America as represented by the United States Atomic Energy Commission Application May 27, 1955, Serial No. 511,804

6 Claims. (Cl. 204—154.2)

The present invention relates to a method and apparatus having particular utility in extracting uranium 233 from thorium in a continuous manner.

Naturally occurring thorium 232 captures a neutron to form thorium 233. This thorium isotope undergoes a beta decay to form protactinium 233 which in turn decays to uranium 233. Uranium 233 is of great value because it is fissionable and can be used in a nuclear reactor as a fuel either by itself or in combination with other fissionable materials. When used as a fuel, the uranium 233 should desirably be separated from thorium because it is more easily used in a concentrated form. However this separation is difficult because usually only a small portion of the thorium subjected to neutron irradiation is converted to uranium in a given period of time such as a day or a week.

The main difficulty stems from the fact that the large bulk of material must be processed to remove the small amount of uranium. In addition to the separation should be carried out as soon after formation of the protactinium and uranium as possible because the protactinium can capture neutrons and result in a net loss of neutrons from the blanket. Each such capture represents a double loss; that of the original neutron which was used to form the protactinium, and the neutron which destroys it. The uranium 233 can also capture neutrons before it is separated from the thorium. In the case of a fission of a uranium 233 atom, more neutrons are produced than are lost. While this is not objectionable if these neutrons can be used efficiently in a well moderated blanket, it does add to the heat production in the blanket. If removal of heat from the blanket is a problem, fission of uranium 233 in the blanket may be avoided by early removal of this element by means of this process.

It is accordingly one of the objects of the present invention to provide a method for early removal of the neutron irradiation products of thorium from the irradiated material. A further object is to provide a continuous and economic method for separating the products of neutron irradiation of thorium. Another object is to provide apparatus useful for removing high percentages of the products of neutron irradiation of thorium from the irradiated material. Still another object is to provide a method for producing uranium 233. Other objects of the invention will be in part apparent and in part poined out hereinafter.

In one of its broader aspects, the objects of the invention are achieved by passing thorium fluoride, which has been subjected to neutron irradiation, through a high temperature zone in the presence of excess fluorine and separating the volatile from the nonvolatile substances emanating from said zone. The method results in the separation of uranium and protactinium from thorium because both uranium and protactinium form volatile fluorides whereas thorium does not. Volatile fission products such as iodine and those which form volatile fluorides may be removed at the same time.

The features and advantages of the present invention are described with reference to the accompanying drawing which is a schematic illustration, partly in section, of an apparatus for passing thorium fluoride powder through a flame containing excess fluorine and for separating the products passing from the flame. In this illustration, the flame constitutes the high temperature zone referred to above.

Referring to the drawing, it may be seen that the apparatus includes a number of powder and gas supply sources 10, 12, 14 and 16, a torch 18 to which these materials are supplied, a combustion and settling chamber 20 and the dust separators 22 and 24 and interconnecting piping. The torch itself is made up of three concentric tubular elements 15, 17 and 19 which include three concentric flow paths 21, 23 and 25. The innermost tube 19 encloses the innermost flow path 21, the extension of this tube forming the supply conduit 26 for introducing gas through the center of the torch. This gas may be supplied from the source 12 through the valves 52 and 54.

The flow path 23 is formed between the outer wall of tube 19 and the inner wall of the tube 17 spaced radially from the inner tube. Supply of gas to this flow path is provided through the conduit 11. Powder can also be supplied to this flow path from a hopper 10 which is connected to the external extension of tube 17 through a pipe 28 and a valve 32. The external extremity of tube 17 is sealed to and supported on the external extension of tube 19. Gas may be supplied to flow path 23 from the source 14 through the valve 58 and the conduit 11. By flowing both powder and gas to path 23 a dispersion of the powder in the gas may be formed and blown into the chamber 20.

The third flow path 25 is formed between the outer surface of tube 17 and the inner surface of the tube 15 which is radially spaced from and concentric with tube 17. The supply of gas to the flow path 25 is provided from a source 16 through valve 62 and tube 36 through one wall of tube 15. Tube 15 is joined at its external end to the external extension of tube 17.

The torch may be sealed and supported in the wall of a combustion and settling chamber 20 by a weld 38 between the outer tube 15 and the chamber wall. The chamber 20 has an upper barrel shaped combustion portion 40 and a lower powder settling conical portion 42. The lower tapered end 42 of the chamber terminates in a tail pipe 46 through which the solid products of the combustion may be removed.

The volatile products of the combustion are removed from chamber 20 through a conduit 68 in the upper end of the chamber and flowed to apparatus suitable for the removal of solids entrained in the gas. The first such apparatus is a cyclone separator 22 of conventional design. The gas and entrained solids enter the separator chamber 71 tangentially through the conduit 70. Solids separate from the gas stream and settle in the lower conical portion 72 of the separator and pass through an exit conduit 74. The lower end of conduit 74 is connected through the wall of the lower end 42 of chamber 20. Powder removed from the gas passing through cyclone separator 22 is flowed to and combined with that settling in the chamber 20.

The gaseous products, passing from the cyclone, flow through the conduit 76 to a filter separator 24. A number of filter ports 80 are provided around the upper cylindrical portion 78 of this chamber and gas is removed from the chamber through these ports to radially extending conduits 82 attached to the port covers 83. Three ports are shown without covers, but are normally covered when in use. The conduits 82 are connected at their radial extension to a manifold 84 and a flow path for gases passing from this manifold is provided by the conduit 86. Solids removed from the gas passing through filter chamber 78 fall to the lower conical section 88 thereof and pass through a conduit 90 to the lower portion 42 of chamber 20.

From the foregoing it is apparent that substantially all of the gaseous products leaving chamber 20 may be removed through the conduit 86 and that substantially all the solid products separated from the gas may be withdrawn through the conduit 46. All metal surfaces of the apparatus contacted by the gaseous products are maintained at about 900° F. in order to prevent condensation of condensable contents of the gas. All components of the apparatus are preferably constructed of some metal such as nickel which is resistant to attack by fluorine gas.

In the operation of the above described illustrative apparatus, the irradiated thorium fluoride powder is dispersed as described above in the gas entering flow path 23 from source 14. The dispersion flows through the path 23 and passes into a torch chamber where it is mixed with gases flowing through the paths 21 and 25. The nozzle end of the torch is so constructed as to cause mixing of the gases passing along the three flow paths as they enter the combustion chamber.

According to one method of operation, florine gas is passed through the outermost flow path 25 and a reducing gas such as hydrogen or deuterium is passed through the innermost flow path 21 to provide a mixture of gases which combine to form a flame in chamber 20. The powder is dispersed and passed along the flow path 23 by supplying an inert gas such as helium from source 14 through conduit 11. The particles of thorium fluoride passing through the flame are momentarily melted. By employing an excess of fluorine gas the melted particles are exposed to an atmosphere of fluorine and any components which form volatile fluorides may be fluorinated and vaporized. A mixture of fluorine and hydrogen in a ratio of 1.1/1 is suitable for producing a flame having excess fluorine. The thorium fluoride passing from the flame freezes in the form of small spheres and settles out to the lower portion of chamber 20.

The gas used to disperse the powder may be an inert gas supplied from the source 14 through the valve 58 and the conduit 11 as descibed above. Fluorine or hydrogen gas can also be used as the dispersal agent. Referring to the figure, it can be seen that hydrogen gas alone or any mixture of hydrogen and inert gas may be supplied to the flow path 23 by adjustment of the valves 54 and 52 which regulate the supply of hydrogen to flow conduit 21 and of valves 58 and 59 which regulate the supply of inert gas and its mixture with hydrogen respectively. For this purpose valve 54 is closed, valve 52 is opened and the mixture proportions determined by regulation of valves 58 and 59. Powder may be dispersed completely with hydrogen by closing valves 58 and 54 and opening valves 59 and 52 to permit flow of hydrogen alone to path 23. Deuterium and other reducing agents, such as methane gas, may be substituted for hydrogen.

The preferred dispersal medium is fluorine diluted with an inert gas. It is apparent that such a dispersal can be provided by reversing the contents of the sources 14 and 16. Such dispersal is preferred because it insures the presence of the particles in a fluorine atmosphere in the flame.

The gaseous product containing the volatilized fluorides of protactinium and uranium passes from the chamber into the conduit 68 to the cyclone separator and filter chamber. After the removal of entrained solids in these two portions of the apparatus, the product gases, which still contain the fluorides of protactinium and uranium, exit through the tube 86. The product gases may be separated by suitable methods such as selective condensation, fractional distillation or others.

In one operation of such a process much of the thorium fluoride passing from the flame was found to be in the form of spheres similar to the irradiated particles which had been introduced into the torch. These spheres were found to contain as little as 15% of the protactinium activity which had been present when they entered the torch. Condensation of gaseous products passing from the torch resulted in the collection of a substantial fraction of the protactinium and uranium without any trace of thorium.

One particular feature of the subject invention is that the thorium fluoride powder produced is in the form of spheres which are suitable for recycling into a blanket and reprocessing through a torch. This spherical form of the product thorium fluoride particles makes them particularly useful in forming a fluid blanket, i.e., one which can be flowed through a blanket region in the form of a moving bed. This is not only useful because it facilitates removal of the irradiated thorium fluoride from the region of high neutron flux, but in addition because the movement of the blanket material makes it useful as a medium for removal of heat from the region.

When flowing the powder through a blanket region as a fluidized or moving bed it is preferred to enhance the fluid properties of the powder by passing a gas upward through the descending powder. The ratio of gas to powder flow may be varied to produce beds of varying fluidity and density. By using a rapidly moving gas stream it is possible to carry the particles up through the blanket region with the ascending stream of gas. When the density of the blanket material is lowered by dilution with gas it may be necessary to recycle the powder through the blanket region a large number of times before enough neutron irradiation has occurred to warrant reprocessing in the torch. Recirculation may be necessary also when the blanket material is used as a heat transfer medium.

The movement of the bed of powder may be employed simply to remove heat generated in the blanket by neutron irradiation and uranium fission. It is estimated that between 5 and 40% of the heat produced in a nuclear reactor may be produced in a blanket. The blanket may be cooled internally with suitable cooling coils or heat exchangers. Heat may also be removed by circulating the blanket itself, at least partly, first through a region of high neutron flux proximate the reactor core and then through an external cooling circuit. This latter scheme is advantageous in avoiding the necessity of having additional cooling means in the reactor and thus in avoiding the resultant loss of neutrons to a nonproductive coolant. The circulation of the blanket also makes possible the processing of the blanket material in apparatus remote from the blanket region.

The rate of introduction and removal of the thorium fluoride powder, and its dispersion medium, to and from the blanket region, determines both the amount of heat which may be removed with a blanket and, for a given neutron flux, the amount of uranium and protactinium which will be formed therein. The subject process is not dependent on the irradiation by neutrons in a blanket region. The thorium can be irradiated by nonreactor neutron sources such as radium beryllium sources or it can be irridated directly in a reactor, such as the reactor disclosed by Fermi and Szilard in U.S. Patent No. 2,708,656, issued May 17, 1955.

One scheme which provides particularly effective neutron irradiation of $ThF_4$ involves dispersing the thorium fluoride powder in heavy water and flowing the dispersion through a blanket region. The blanket serves in this case not only to convert the thorium to uranium by neutron capture and to remove heat, but to moderate high energy neutrons entering the blanket. Since the thorium fluoride is separated from the heavy water before being processed there is no loss of the expensive deuterium oxide and it may be recycled. Quantitative removal of the heavy water by heating the thorium fluoride to dry it before processing is desirable not only to minimize loss of deuterium oxide but also to facilitate dispersing the powder in a gas.

The subject process is useful for removing uranium and protactinium produced by the neutron irradiation of thorium fluoride by any neutron source and, in fact, can be employed in the removal of thorium and protactinium from thorium which has been first irradiated and then formed into the fluoride. From the foregoing it is apparent that the process has particular utility in removal of the radiation products from thorium fluoride because it produces the thorium fluoride in a finely divided state suitable for subsequent irradiation and recycling through the torch and it is thus useful as a continuous or cyclic process.

The process is economic because the hydrogen fluoride produced by the burning of hydrogen in the fluorine atmosphere can be recovered and converted to fluorine by conventional electrolytic techniques.

Other means for momentarily melting the $ThF_4$ particles in the presence of excess fluorine to volatilize radiation products therefrom, such as a high temperature arc or resistance heating of a reaction zone, may be employed in carrying out the subject process.

The term "blanket" as used herein should be taken to mean a region or chamber so situated with respect to a source of neutrons that the neutrons pass from the source into the region or chamber in large numbers. Neutrons may, in addition, originate in the blanket and the term is used mainly to distinguish from the primary source of neutrons.

Since many embodiments might be made in the present invention and since many changes might be made in the embodiment described, it is to be understood that the foregoing description is to be interpreted as illustrative only and not in a limiting sense.

We claim:

1. The method of removing the products of the neutron irradiation of thorium from said thorium which comprises forming finely divided thorium fluoride, subjecting said fluoride to neutron irradiation, dispersing the irradiated fluoride in a fluorine containing gas to form a stream, passing said stream into contact with a stream of gas containing hydrogen to form a flame in which fluorine is in excess, and to momentarily melt said thorium fluoride, and separately collecting the thorium fluoride and other substances passing from said flame.

2. The method of extracting uranium 233 from thorium which comprises forming finely divided thorium fluoride, dispersing said thorium fluoride in a fluorine-containing gas to form a stream, combining and mixing the stream with a stream of hydrogen-containing gas to form a flame, subjecting the thorium fluoride passing from said flame to neutron irradiation by flowing it as a moving bed through a region of high neutron flux proximate a nuclear reactor, passing the irradiated fluoride again through a flame formed by burning hydrogen and fluorine wherein said fluorine is in excess, and separating the volatile from the non-volatile substances passing from said flame.

3. The method of producing uranium 233 which comprises forming finely divided thorium fluoride, dispersing said fluoride in deuterium oxide, streaming the dispersion through a region in which a high flux of neutrons exists, separating the thorium fluoride from the deuterium oxide, dispersing said fluoride in a stream of gas containing fluorine, combining said fluorine-containing stream with a stream of gas containing hydrogen to form a flame in which fluorine is in excess, and separating the volatile from the non-volatile substances passing from said flame.

4. The method of producing uranium 233 which comprises forming finely divided thorium fluoride, passing said fluoride as a moving bed through a region of high neutron flux proximate a reactor to irradiate it with neutrons, dispersing the fluoride in a gas containing fluorine, momentarily melting the particles of fluoride in a flame formed by the burning of a hydrogen-containing gas in an excess of fluorine and separating and collecting the volatile products passing from said flame.

5. The method of removing the products of neutron irradiation of thorium fluoride from said fluoride which comprises dispersing said fluoride in a gas containing fluorine, and passing said gas and dispersed fluoride into contact with a hydrogen-containing gas to form a flame containing about a 10% excess of fluorine gas.

6. The method of continuously removing the products of neutron irradiation from thorium fluoride which comprises subjecting said fluoride to neutron irradiation, dispersing said irradiated fluoride in a gas containing fluorine, reacting said fluoride containing gas with hydrogen containing gas to form a flame containing about a 10% excess of fluorine gas, separating the thorium fluoride from the more volatile products passing from said flame, separating hydrogen fluoride from said more volatile products, electrolyzing said hydrogen fluoride to form hydrogen and fluorine and repeating said process.

References Cited in the file of this patent

Katz et al.: "The Chemistry of Uranium" (NNES VIII–5), McGraw-Hill Book Co., N.Y. (1951), pp. 398, 442.

Chemical Eng. Progress Symposium Series, No. 12 (1954), vol. 50, Nuclear Engineering, part II, publ. by American Institute of Chemical Engineers, 25 W. 45th St., N.Y. 36, N.Y. (papers presented at Ann Arbor, Mich., in June 1954, pp. 173–180).